United States Patent
Fujii

(10) Patent No.: US 7,969,582 B2
(45) Date of Patent: Jun. 28, 2011

(54) LASER SCANNING MICROSCOPE APPARATUS, AND SURFACE SHAPE MEASURING METHOD THEREOF

(75) Inventor: Akihiro Fujii, Tokyo (JP)

(73) Assignee: Olympus Corporation, Tokyo (JP)

( * ) Notice: Subject to any disclaimer, the term of this patent is extended or adjusted under 35 U.S.C. 154(b) by 333 days.

(21) Appl. No.: 12/334,921

(22) Filed: Dec. 15, 2008

(65) Prior Publication Data

US 2009/0153878 A1    Jun. 18, 2009

(30) Foreign Application Priority Data

Dec. 17, 2007  (JP) .................................. 2007-325027

(51) Int. Cl.
*G02B 21/06* (2006.01)
*G01B 11/24* (2006.01)

(52) U.S. Cl. ........ 356/601; 356/607; 356/634; 356/635; 250/234; 250/372; 359/385

(58) Field of Classification Search .................. 356/601, 356/607, 608, 614, 634–636, 317, 329; 250/234, 250/459.1, 372, 373; 358/385, 370, 577
See application file for complete search history.

(56) References Cited

U.S. PATENT DOCUMENTS

| | | | | |
|---|---|---|---|---|
| 4,959,552 A * | 9/1990 | Saffert et al. | ............. | 250/559.26 |
| 6,181,474 B1 * | 1/2001 | Ouderkirk et al. | ............. | 359/629 |
| 6,263,234 B1 * | 7/2001 | Engelhardt et al. | ............. | 600/476 |
| 6,403,966 B1 * | 6/2002 | Oka | ............. | 250/372 |
| 6,548,796 B1 * | 4/2003 | Silvermintz et al. | ....... | 250/201.3 |
| 7,235,777 B2 * | 6/2007 | Hecht | ............. | 250/234 |
| 7,365,842 B2 * | 4/2008 | Kitagawa | ............. | 356/317 |

FOREIGN PATENT DOCUMENTS

| | | |
|---|---|---|
| JP | 2004-078175 A | 3/2004 |
| JP | 3835505 B2 | 4/2006 |
| JP | 2006-126374 A | 5/2006 |

OTHER PUBLICATIONS

Korean Office Action dated Jan. 6, 2011 in counterpart Korean Application No. 10-2008-0128142.
Geometrical Product Specifications (GPS) Surface Texture: B0601; Profile Method; 2001; pp. 574-587 and pp. 21-34.
Geometrical Product Specifications (GPS) Surface Texture: B0632; Profile Method; 2001; pp. 594-599.

\* cited by examiner

*Primary Examiner* — Sang Nguyen
(74) *Attorney, Agent, or Firm* — Holtz, Holtz, Goodman & Chick, PC

(57) ABSTRACT

A laser scanning microscope apparatus comprising, a controlling unit for obtaining height information at each scanning point of a sample to be examined by obtaining a relative distance that maximizes an intensity output from a photodetecting unit, which is obtained when the sample to be examined is scanned with a light from a laser light source, when a relative distance is changed by a Z scanning unit, includes an arithmetic processing unit for obtaining a plurality of height profiles of one line acquired by scanning the sample to be examined in a state of light with the light defecting unit while shifting the plurality of height profiles of one line in a scanning direction by a predetermined amount, and for obtaining one profile by linking the plurality of height profiles.

22 Claims, 14 Drawing Sheets

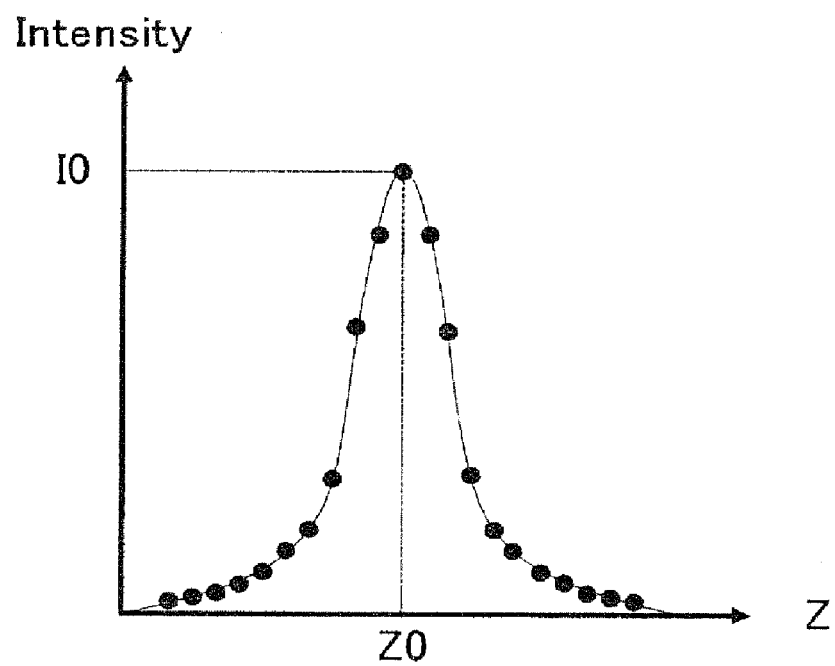
F I G. 3

FIG. 8A
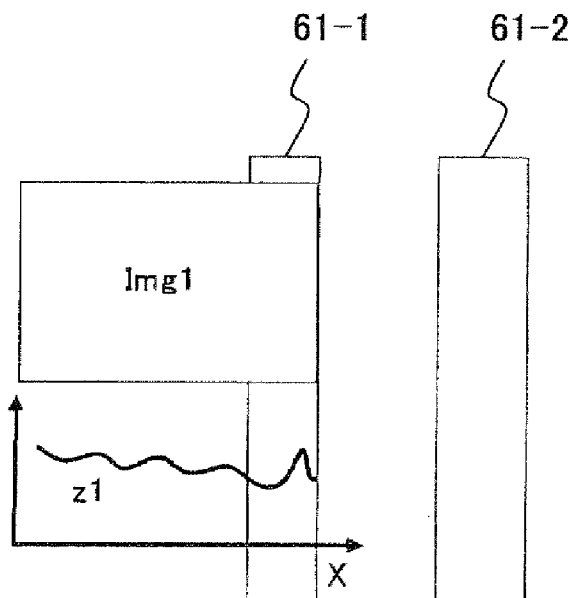
FIG. 8B
FIG. 8C
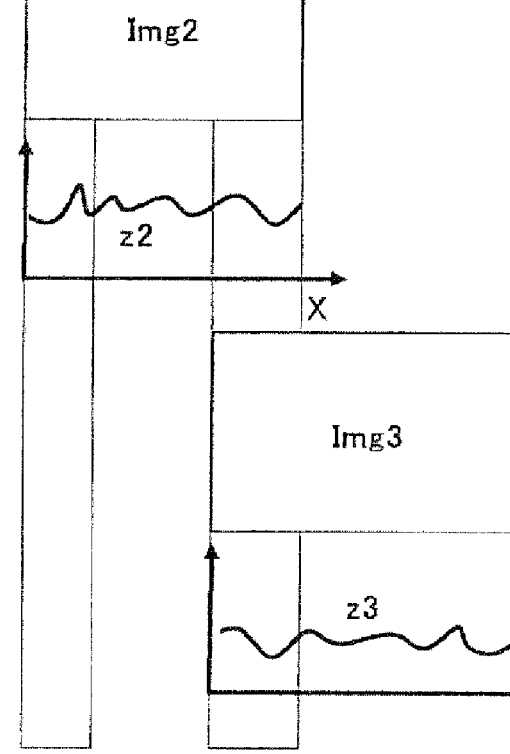

LASER SCANNING MICROSCOPE APPARATUS, AND SURFACE SHAPE MEASURING METHOD THEREOF

CROSS REFERENCE TO RELATED APPLICATIONS

This application claims benefit of Japanese Application No. 2007-325027 filed Dec. 17, 2007, the contents of which are incorporated by this reference.

BACKGROUND OF THE INVENTION

1. Field of the Invention

The present invention relates to a laser scanning microscope apparatus, and more particularly, to a technique for linking height information and/or intensity images of a plurality of partitioned regions with the laser scanning microscope apparatus.

2. Description of the Related Art

Laser scanning microscopes are known as apparatuses for measuring a three-dimensional shape in a non-contact manner.

The laser scanning microscopes two-dimensionally scan a sample to be examined with a laser light that an objective lens gathers in the state of a spot, and receive the reflected light via a confocal diaphragm arranged in a position conjugate to the focal position of the objective lens. Because only light of a focused portion is received with the confocal diaphragm, only the focused portion can be observed.

With this principle, the height of the entire surface of the sample to be examined is measured by obtaining a focal position over the entire surface of the sample to be examined while changing a relative distance Z between the objective lens and the sample to be examined.

In accordance with this measurement principle, a technique for obtaining a focal position is implemented. Therefore, an objective lens with a small focal depth, namely, with a high magnification must be used to make a measurement with high accuracy.

In this case, a range that can be measured at one time becomes narrow. Therefore, a measurement viewfield is increased while maintaining the vertical and the horizontal resolutions of the measurement by measuring some small regions into which a desired measurement region is partitioned, and by linking the measurement data of the small regions in the direction of the surface.

For example, Patent Document 1 (Patent Gazette No. 3835505) discloses a non-contact apparatus for shaping a measurement image by linking a plurality of images. According to Patent Document 1, a region is partitioned into a plurality of measurement images, shape data is calculated by using interference fringes for each of the measurement images, and the images are linked so that the shape data are best aligned.

In the meantime, there is a stylus roughness meter as an apparatus that can measure the height information of a large measurement region with relative ease.

With the stylus roughness meter, the height information of a sample to be examined is obtained by tracing the surface of the sample with a stylus while relatively moving the stylus and the sample.

SUMMARY OF THE INVENTION

A laser scanning microscope apparatus according to the present invention is a laser scanning microscope having a light deflecting unit that gathers light from a laser light source on a sample to be examined through an objective lens and can scan the sample to be examined independently in a surface direction with the laser light, a photo-detecting unit for detecting the amount of light that transmits an optical diaphragm arranged in a position conjugate to the focal position of the objective lens and is reflected from the sample to be examined, a Z scanning unit for changing a relative distance, in the direction of the optical axis of the objective lens, between the sample to be examined and the objective lens, and a controlling unit for obtaining height information at each scanning point of the sample to be examined by obtaining the relative distance that maximizes an intensity output from the photo-detecting unit, which is obtained when the sample to be examined is scanned with the light from the laser light source, when the relative distance is changed by the Z scanning unit, and includes an arithmetic processing unit for obtaining a plurality of height profiles of one line acquired by scanning the sample to be examined in the state of a line with the light deflecting unit while shifting the plurality of height profiles in a scanning direction by a predetermined amount and for obtaining one profile by linking the plurality of height profiles.

A laser scanning microscope apparatus in another mode of the present invention is a laser scanning microscope having a light deflecting unit that gathers light from a laser light source on a sample to be examined through an objective lens and can scan the sample to be examined independently in a surface direction with the laser light, a photo-detecting unit for detecting the amount of light that transmits an optical diaphragm arranged in a position conjugate to the focal position of the objective lens and is reflected from the sample to be examined, a Z scanning mechanism for changing a relative distance, in the direction of the optical axis of the objective lens, between the sample to be examined and the objective lens, and a controlling unit for obtaining height information at each scanning point of the sample to be examined by obtaining the relative distance that maximizes an intensity output from the photo-detecting unit, which is obtained when the sample to be examined is scanned with the light from the laser light source, when the relative distance is changed by the Z scanning mechanism, and includes an illumination optics system of the laser scanning microscope, which is arranged to share the objective lens within an optics system of the microscope, a two-dimensional image capturing unit for capturing an image with light from the illumination optics system, and an arithmetic processing unit for obtaining a plurality of height profiles of one line acquired by scanning the sample to be examined in the state of a line with the light deflecting unit while shifting the plurality of height profiles in a scanning direction by a predetermined amount, for obtaining an intensity image with the two-dimensional image capturing unit when obtaining a height profile, and for obtaining one height profile and one intensity image based on the pluralities of height profiles and intensity images.

A method for measuring a surface shape with a laser scanning microscope apparatus according to the present invention is a method for measuring a surface shape of a sample to be examined with a laser scanning microscope having a light deflecting unit that gathers light from a laser light source on a sample to be examined through an objective lens and can scan the sample to be examined independently in a surface direction with the laser light, a photo-detecting unit for detecting the amount of light that transmits an optical diaphragm arranged in a position conjugate to the focal position of the objective lens and is reflected from the sample to be examined, a Z scanning mechanism for changing a relative distance, in the direction of the optical axis of the objective lens, between the sample to be examined and the objective lens, and a controlling unit for obtaining height information at each scanning point of the sample to be examined by obtaining the relative distance that maximizes an intensity output from the photo-detecting unit, which is obtained when the sample to be examined is scanned with the light from the laser light source, when the relative distance is changed by the Z scanning mechanism, and includes causing an operator to instruct a position desired to be measured within a microscope image of the sample to be examined, measuring a height profile of one line that passes through the instructed position, moving the positions of the sample to be examined and the objective lens in the scanning direction of the measured height profile by a predetermined distance and measuring a height profile in an extended line of the measured height profile, repeatedly moving the positions of the sample to be examined and the objective lens and repeatedly measuring a height profile in the extended line of the measured height profile until the moved length distance reaches a particular value, and generating one continuous height profile data by linking a plurality of measured height profiles.

A method for measuring a surface shape with a laser scanning microscope apparatus in another mode of the present invention is a method for measuring a surface shape of a sample to be examined with a laser scanning microscope having a light deflecting unit that gathers light from a laser light source on a sample to be examined through an objective lens and can scan the sample to be examined independently in a surface direction with the laser light, a photo-detecting unit for detecting the amount of light that transmits an optical diaphragm arranged in a position conjugate to the focal position of the objective lens and is reflected from the sample to be examined, a Z scanning mechanism for changing a relative distance, in the direction of the optical axis of the objective lens, between the sample to be examined and the objective lens, and a controlling unit for obtaining height information at each scanning point of the sample to be examined by obtaining the relative distance that maximizes an intensity output from the photo-detecting unit, which is obtained when the sample to be examined is scanned with the light from the laser light source, when the relative distance is changed by the Z scanning mechanism, and includes causing an operator to instruct a position desired to be measured within a microscope image of the sample to be examined, measuring a height profile of one line that passes through the instructed position and capturing a two-dimensional intensity image at the measured position, relatively moving the positions of the sample to be examined and the objective lens by a predetermined distance in a scanning direction when the height profile of one line is measured, measuring a height profile in an extended line of the measured height profile of one line at the relatively moved position and capturing a two-dimensional image at the measured position, repeatedly measuring a height profile in the extended line and repeatedly capturing a two-dimensional image at the measured position until the relatively moved distance becomes a particular value or more, and generating one continuous height profile data and continuous image by linking the pluralities of measured height profiles and two-dimensional intensity images.

BRIEF DESCRIPTION OF THE DRAWINGS

FIG. 3 is a diagram showing an intensity change curve obtained by altering a relative distance between an objective lens and a sample to be examined by using a Z scanning stage;

FIGS. 8A, 8B, and 8C are schematic diagrams showing intensity images obtained with the laser scanning microscope according to the second embodiment;

DESCRIPTION OF THE PREFERRED EMBODIMENTS

Embodiments according to the present invention are described below with reference to the drawings.

Figure 1:
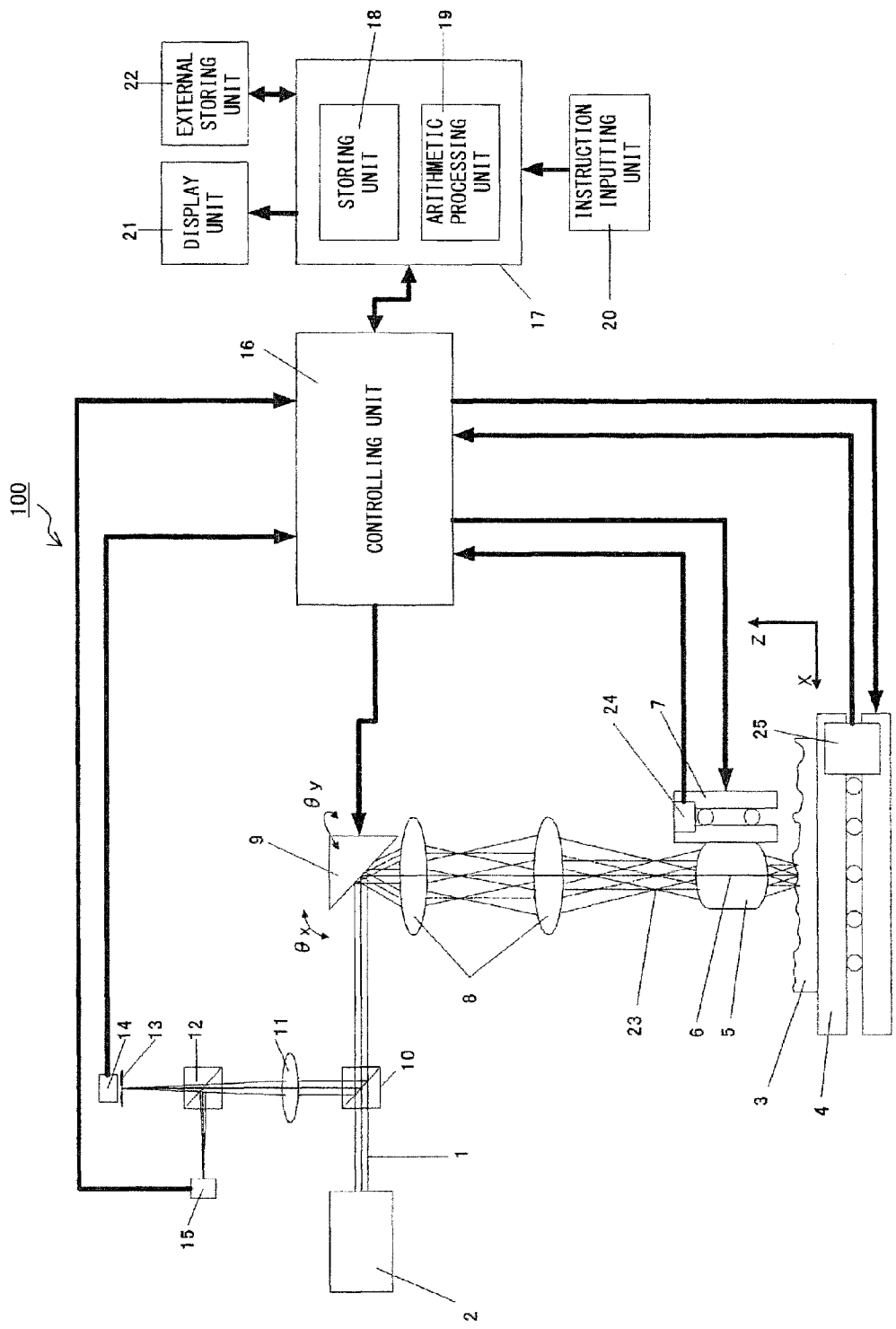
FIG. 1 is a schematic diagram showing a configuration of a laser scanning microscope according to a first embodiment.

FIG. 1 is a schematic diagram showing a configuration of a laser scanning microscope according to a first embodiment.

The laser scanning microscope 100 shown in this figure includes a laser light source 2 for emitting collimated light 1, and a two-dimensional light deflector 9 for reflecting the collimated light 1 to a desired direction.

The two-dimensional light deflector 9 can independently change the direction of its reflection plane, and its deflection angles $\theta x$ and $\theta y$ are changed upon receipt of a deflection timing instruction issued from a controlling unit 16 to be described later. Only light deflected in the $\theta x$ direction is depicted as a light beam in FIG. 1.

The laser scanning microscope 100 also includes pupil projection lenses 8 for magnifying and projecting the diameter of a collimated light flux reflected by the two-dimensional light deflector 9, and an objective lens 5 arranged so that its focal position 23 on the back side is located in the vicinity of the focal position of the pupil projection lens 8. In the vicinity of the focal position on the front side of the objective lens 5, a sample 3 to be examined is placed.

Additionally, a first beam splitter 10 is arranged between the laser light source 2 and the two-dimensional light deflector 9, and an image forming lens 11 and a second beam splitter 12 are arranged on the side of the reflection light path of the first beam splitter 10. A confocal diaphragm 13 is arranged in the focal position of the image forming lens 11 on the side of the transmission light path of the second beam splitter 12, and a first photodetector 14 is arranged on the back side of the confocal diaphragm 13. Moreover, a second photodetector 15 is arranged in the focal position of the image forming lens 11 on the side of the reflection light path of the second beam splitter 12.

The objective lens 5 is secured to a Z scanning stage 7 that is movable in the direction parallel to the optical axis 6 of the objective lens 5. The sample 3 to be examined is placed on the stage device 4 that is movable in the direction parallel to the scanning direction θy of the two-dimensional light deflector 9. The stage device 4 and the Z scanning stage 7 are respectively provided with first and second displacement meters 24 and 25 for reading their move distance.

The controlling unit 16 is connected to a computer 17, receives an input instruction from an instruction inputting unit 20 (such as a keyboard, a pointing device, etc.) that is connected to the computer 17, and controls the stage device 4, the Z scanning stage 7, and the two-dimensional light deflector 9. The controlling unit 16 also receives intensity values obtained with the first and the second photodetectors 14 and 15, and displacement values (coordinate values) from the first and the second displacement meters 24 and 25, and notifies the computer 17 of these values.

To the computer 17, a display unit 21 for displaying measurement results, measurement conditions, etc., and an external storing unit 22 such as a hard disk, a USB memory, a CD-R, a DVD, a flexible disk, or the like are connected. The computer 17 includes a storing unit 18 for temporarily storing data from the controlling unit 16 and for storing arithmetic results, and an arithmetic processing unit 19 for performing various types of arithmetic operations.

The collimated light 1 emitted from the laser light source 2 transmits the first beam splitter 10, and is reflected by the two-dimensional light deflector 9. A relationship between the output angle of the light reflected by the two-dimensional deflector 9 and light on the sample 3 to be examined will be described later.

The light deflected in various directions is magnified by the pupil projection lenses 8, and incident to the objective lens 5 after being gathered at the focal position 23 on the back side of the objective lens 5. The light incident to the objective lens 5 illuminates one point of the sample 3 to be examined in the state of a spot.

Figure 2:
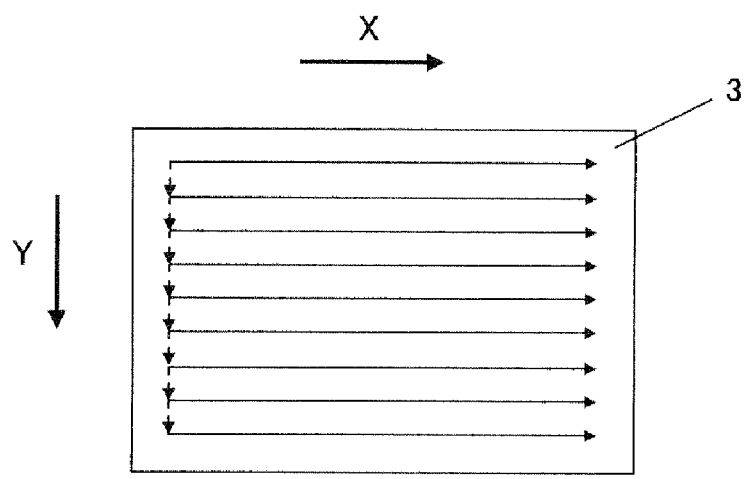
FIG. 2 is a schematic diagram showing the locus of raster scan.

The light in the state of a spot is scanned in the locus shown in FIG. 2 on the sample 3 to be examined. This is a method generally called raster scan, and scanning in the directions θx and θy of the two-dimensional light deflector 9 respectively correspond to scanning in X and Y directions shown in FIG. 2. With this method, scanning is made at high speed in the θx direction, and at a lower speed in the θy direction. As a mechanism suitable for such scanning, for example, a resonant galvanometer mirror is used for high-speed scanning in the θx direction, and a galvanometer mirror, etc. is used for low-speed scanning in the θy direction.

The light reflected on the sample 3 to be examined again passes through the objective lens 5 and the pupil projection lenses 8, are reflected by the two-dimensional light deflector 9, and further reflected by the first beam splitter 10. The light gathered by the image forming lens 11 is incident to the second beam splitter 12, the light that transmits the second beam splitter 12 is incident to the confocal diaphragm 13, and the light that can transmit the confocal diaphragm 13 is received by the first photodetector 14.

Here, only the light at the focal position can transmit the confocal diaphragm 13. In contrast, the light reflected by the second beam splitter 12 is received by the second photodetector 15 unchanged.

The light that changes with the operation of the two-dimensional light deflector 9 and is received by the first or the second photodetector 14 or 15 is sent to the controlling unit 16, and an intensity image is configured according to a deflection timing instruction signal that the controlling unit 16 issues to the two-dimensional light deflector 9. Its result is displayed on the display unit 21 in real time via the computer 17.

If the displayed image is an image based on the intensity information of the first photodetector 14, it becomes a confocal image (hereinafter referred to as a CF image). Alternatively, if the displayed image is an image based on the intensity information of the second photodetector 15, it becomes a non-confocal image (hereinafter referred to as an NCF image).

When a CF image is obtained while changing the relative distance between the objective lens 5 and the sample 3 to be examined by using the Z scanning stage 7 (this operation is hereinafter referred to as Z scanning), an intensity change curve shown in FIG. 3 is obtained at one point of the sample 3 to be examined (this intensity change curve is hereinafter referred to as an IZ curve).

By obtaining a Z position Z0 at which the IZ curve reaches the peak for each measurement point, the height of the sample 3 to be examined can be measured. A coordinate value from the first displacement meter 24, and a value obtained with the first photodetector 14 are respectively used as the Z coordinate (Z) and an intensity value (I) of the IZ curve. These values are sent to the computer 17 via the controlling unit 16, and the arithmetic processing unit 19 detects the peak position.

The peak position may be detected by identifying a Z coordinate that gives the maximum intensity among data obtained at discrete Z scanning intervals, or a peak position other than a sampling point may be estimated from a discrete measurement point with a method such as interpolation, etc.

Additionally, the relative distance to the sample 3 to be examined is changed by moving the objective lens 5 in the example shown in FIG. 1 as Z scanning means. Alternatively, a scanning mechanism for moving the sample 3 to be examined in the direction of the optical axis 6 when the position of the objective lens 5 is stationary may be provided. Namely, any mechanism may be available as far as it can change the relative distance between the objective lens 5 and the sample 3 to be examined.

Operations for measuring the roughness of the surface of the sample to be examined are described in detail below as an example.

Figure 4:
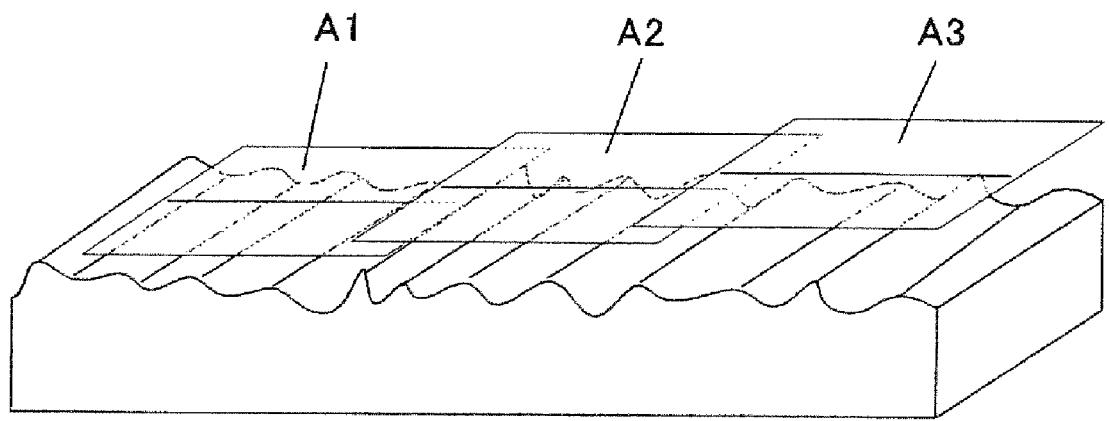
FIG. 4 is a schematic diagram showing an example where a measurement region is partitioned to fit the size of an observable viewfield of the laser scanning microscope.

When the roughness of the surface of the sample 3 to be examined is measured, a desired measurement region is partitioned to fit the size of the observable viewfield of the laser scanning microscope as shown in FIG. 4.

In FIG. 4, the measurement region is partitioned into three regions such as A1, A2, and A3, and two adjacent regions respectively have their overlapping region.

Not scanning in the θy direction of the two-dimensional light deflector 9 but scanning in the θx direction only (hereinafter referred to as X scanning) is made in the state where the region A1 is observed. At this time, one line within the region A1, which corresponds to the θx direction, is scanned on the sample 3 to be examined.

By making Z scanning while making X scanning, the height profile of one line within the region A1 can be obtained.

Here, if only X scanning that can be made at high speed is used to obtain the height profile of one line, there is no need to stop Z scanning each time line data is captured at the time of Z scanning. Making X scanning without stopping Z scanning does not matter.

Next, the stage device 4 is moved in the X direction to shift the observation viewfield of the microscope to the region A2.

Also at this time, the height profile of one line within the region A2 is obtained by making X scanning and Z scanning for only one line within the region A2. A similar measurement is made for the region A3.

Figure 5A:
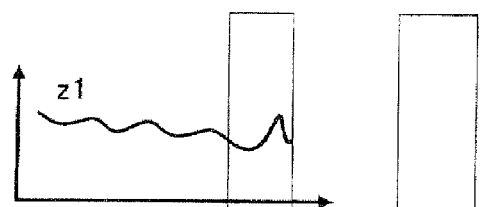
FIGS. 5A, 5B, 5C, and 5D are schematic diagrams showing three pieces of obtained height profile data, and a height profile acquired by linking the three pieces.
Figure 5B:
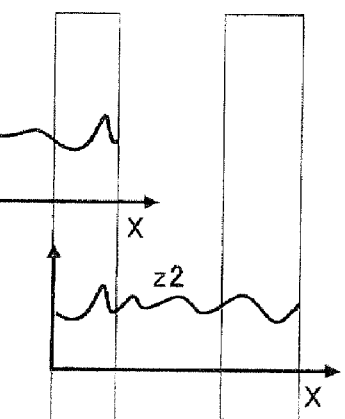
Figure 5C:
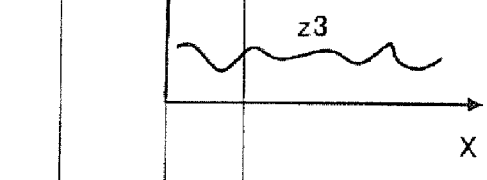

With these operations, three pieces of height profile data z1, z2, and z3, which are shown in FIGS. 5A, 5B, and 5C, are obtained.

Figure 5D:
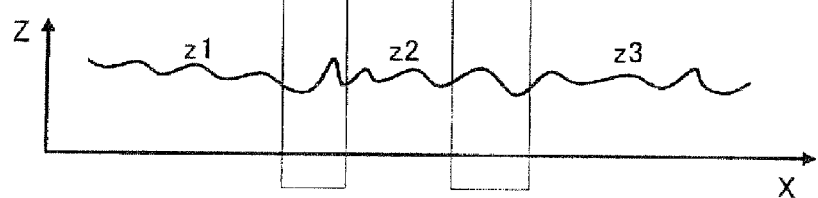

By linking the height profile data z1, z2, and z3 while shifting them in the X and the Z directions so that the height information of the overlapping regions (within dotted frames in FIGS. 5A, 5B, and 5C) of the data are best aligned, one continuous height profile shown in FIG. 5D can be obtained.

The linked height profile data is stored in the storing unit 18 as one data file, to which various types of data analyses are made. Additionally, this data can be stored in the external storing unit 22 and carried as needed. Therefore, the data can be analyzed with another data analysis application by using the external storing unit 22.

A calculation of the roughness of the surface is described as an analysis example.

Generally, an evaluation length of several mm to several tens of mm is required to measure the roughness of a surface by using a stylus roughness meter. However, if a height measurement is made by using the laser scanning microscope, a data analysis made with arithmetic operations equivalent to those of a stylus roughness meter cannot be made because the size of one viewfield is on the order of 0.5 mm in many cases.

However, a measurement length can be extended almost as long as that of a stylus roughness meter by using a linked height profile as data to be analyzed. As a result, an analysis equivalent to the stylus roughness meter can be made.

Specifically, the cutoff filter of the stylus roughness meter is stipulated by Japan Industrial Standard (JIS) B0601:2001.

As stipulated by JIS B0601:2001, various types of roughness parameters (such as an arithmetic mean height Pa, Ra, and Wa, and a maximum cross-sectional height Pz, Rz, and Wa) are calculated after profile data is separated into a roughness component and an rugate component by executing a frequency filter process. For example, a Gaussian filter that is one type of a phase compensation filter stipulated by JIS B0632:2001 is used as the frequency filter. This embodiment is described by taking the Gaussian filter as an example of the frequency filter. However, the frequency filter is not limited to this one. A 2RC filter of the old standard illustrated in the explanatory diagram 7-9 of JIS B0601:2001, a butterworth filter widely used as a frequency filter, or the like may be available.

Additionally, the data may be analyzed with another data analysis application, into which the data is read by using the external storing unit 22 as needed.

The above description is provided by taking the example where the measurement region is partitioned into three regions. However, the measurement region may be partitioned into two, or four regions or more.

Furthermore, the height profiles are linked so that the height shape information of one combination of overlapping regions are best aligned in the above provided example. However, this embodiment is not limited to this linkage method. The data may be linked based on the coordinate values of the respective pieces of data by using the coordinate values of the first and the second displacement meters 24 and 25.

Still further, the profile of one line is measured by making scanning in the X direction in the above described example. However, the profile of one line may be measured in the Y direction, or a plurality of height profiles may be measured while shifting the position of the stage device 4 in the Y direction. Alternatively, one oblique line may be measured by causing the operations of the scanner in the X and the Y directions to be performed cooperatively.

Still further, the measurement region is partitioned in the X direction and linked in FIG. 4. However, the measurement region may be partitioned in the Y direction and linked, or may be partitioned in both the X and the Y directions and linked.

With the laser scanning microscope 100 according to the first embodiment, images of partitioned regions are linked by using a height profile of one line, whereby the processing can be executed at high speed.

Additionally, low-speed Y scanning among the three scanning (X scanning, Y scanning, and Z scanning) of the laser microscope is not used when the height profile of one line is measured in the X direction, whereby a height profile can be obtained at higher speed.

The effects of these speed-ups increase as a region to be measured becomes larger and the number of partitioned regions grows.

Additionally, the viewfield of a laser scanning microscope in the case where an objective lens sufficient to measure the shape of a cross section on the order of submicrons is used is approximately 0.5 mm in many cases, and it is not unusual to partition a measurement region into 10 regions or more in order to secure, for example, a measurement length of several millimeters to several tens of millimeters, which is required to measure the roughness of a surface. Assuming that a measurement region of a three-dimensional surface is partitioned into 10 regions, each of which requires one minute for its measurement using a conventional method, 10 minutes are required to measure the 10 regions. In the meantime, with the laser scanning microscope 100 according to this embodiment, a height profile of one region can be measured in several seconds. Therefore, approximately one minute only is required to measure the height profiles of the 10 regions, thereby improving the tact almost by 10 times.

Furthermore, a linked profile is used as data to be analyzed, whereby an analysis equivalent to a widely used conventional stylus roughness meter can be made, and a measurement and a comparison, which are compatible with the stylus roughness meter, can be made.

Still further, since the amount of handled data is reduced, a large capacity of memory is not required for arithmetic operations, data analyses and storage. As a result, the laser scanning microscope can be implemented as a cost-effective apparatus. Moreover, since the amount of data is small, data can be stored on a small-capacity memory, such as a flexible disk, etc., and carried as needed when the data is stored in the external storing unit 22.

Still further, profiles are linked so that the height profiles (the height information of a cross section) of overlapping portions of partitioned regions are best aligned in the above described first embodiment. However, a way of linking partitioned regions is not limited to this method.

Figure 6A:
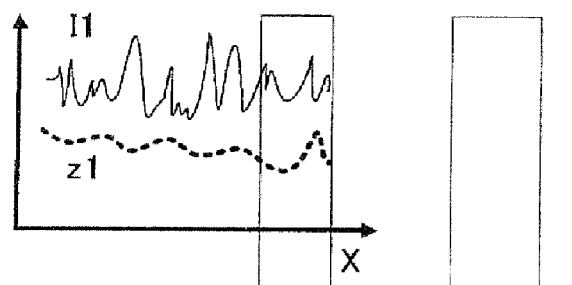
FIGS. 6A, 6B, 6C, and 6D are schematic diagrams showing the intensity information and the height information of a cross section, which are obtained with a modification example of the first embodiment.
Figure 6B:
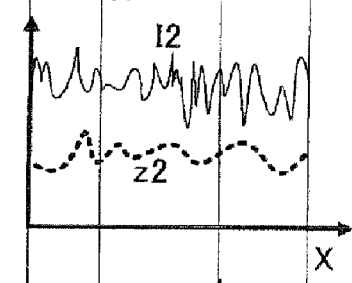
Figure 6C:
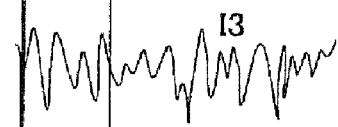

Still further, when the height profile of one line is obtained, Z0 shown in FIG. 3 is obtained at each measurement point. However, as a modification example, also an intensity profile of a cross section can be obtained in a similar manner by obtaining an intensity peak value I0 at each measurement point. Namely, information obtained in each measurement region is calculated as combination data of intensity information (I1, I2, I3) and height information (Z1, Z2, Z3) of the cross section, which are shown in FIGS. 6A to 6C.

Figure 6D:
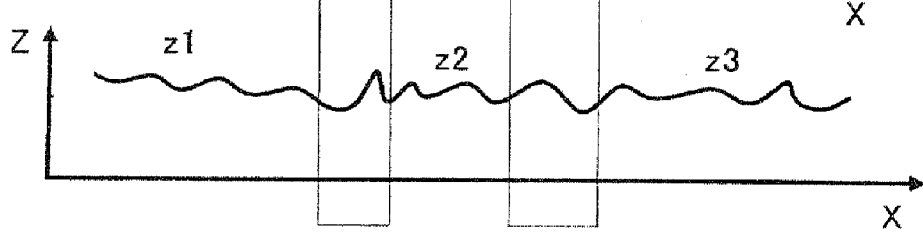

When height profiles are linked, a move amount in the X direction (a move amount to a linkage position in the X direction) is determined based on the intensity profile information (I1, I2, I3), and a move amount in the Z direction is then determined so that the height information (Z1, Z2, Z3) of overlapping portions are best aligned. The height information of the cross section obtained by linking the three partitioned regions in this way is shown in FIG. 6D.

Note that the processes executed to display, analyze, and store linked data are the same as those executed in the above described case using the height profiles (the height information of the cross section) of overlapping portions.

The intensity profile information (I1, I2, I3) are sensitive to a minute flaw, and projections and depressions on a surface, and prone to become profiles that exhibit more distinctive characteristics than those of height information (Z1, Z2, Z3).

Accordingly, if the method in this modification example is used, the intensity information is information obtained based on the maximum intensity value of an IZ curve. Therefore, this is high-contrast information focused on the surface of the sample to be examined, and at the same time, also characteristics of the surface, which do not appear in the height information, such as a fine texture of the surface, a difference of a reflectance, etc. are reflected on the information. Accordingly, data can be linked with higher accuracy in the X direction by using and linking profiles with the intensity information, thereby improving the reliability of measurement data.

A second embodiment is described next.

Figure 7:
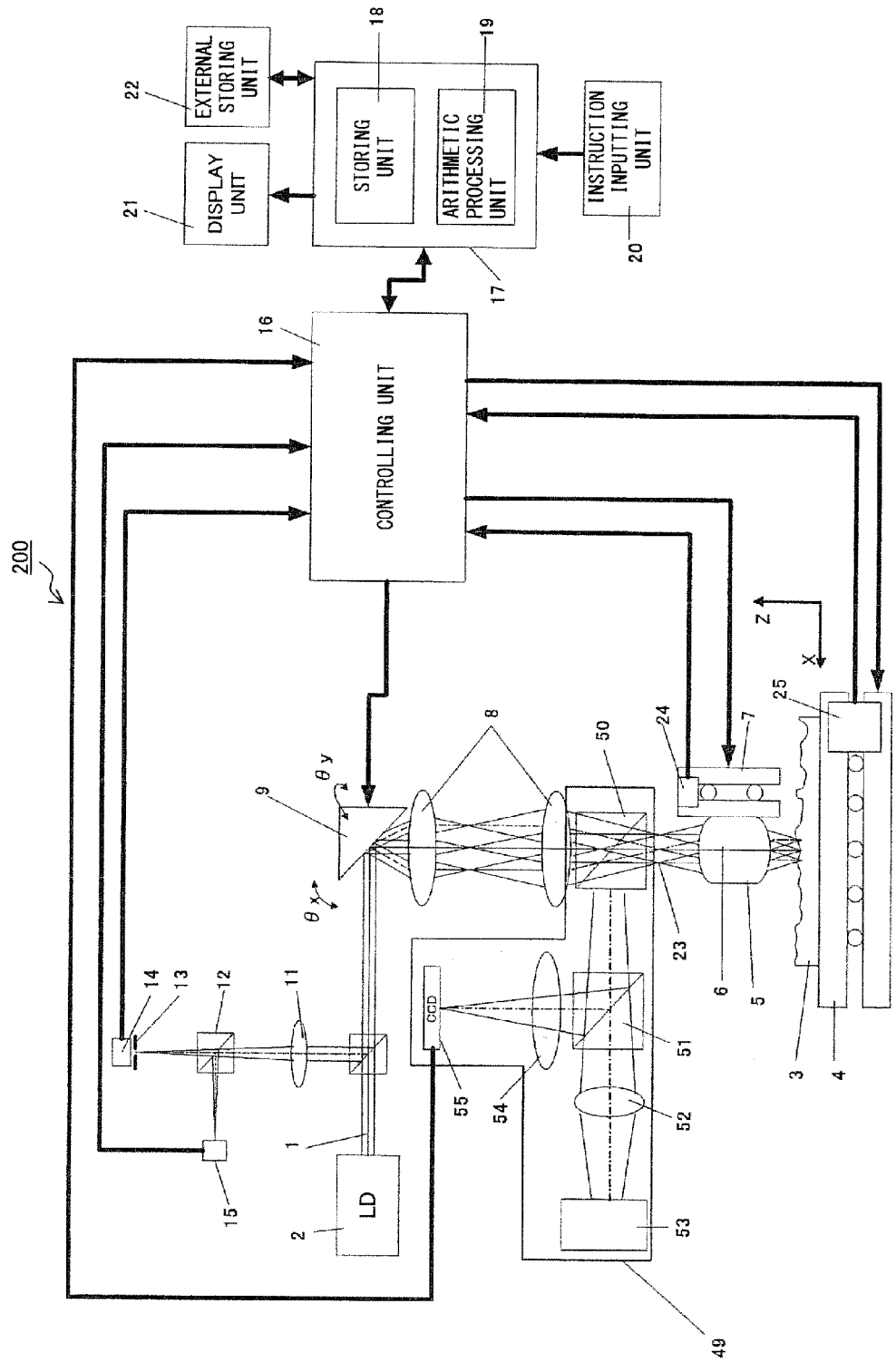
FIG. 7 is a schematic diagram showing a configuration of a laser scanning microscope according to a second embodiment.

FIG. 7 is a schematic diagram showing a configuration of a laser scanning microscope 200 according to the second embodiment.

The laser scanning microscope 200 according to the second embodiment shown in FIG. 7 is implemented by newly adding a TV optics system 49 to the configuration of the laser scanning microscope 100 according to the first embodiment shown in FIG. 1. Constituent elements other than the TV optics system 49 are almost the same as those of the laser scanning microscope 100 according to the first embodiment. Therefore, explanations about the details of these constituent elements are omitted.

In the configuration shown in FIG. 7, the TV optics system 49 is interposed on the optical path between the objective lens 5 and the pupil projection lens 8, and a third beam splitter 50 is arranged on the optical path. A fourth beam splitter 51 is arranged on the optical path on the reflection side of the third beam splitter 50, and a projection lens 52 and a white LED light source 53 are arranged on the optical path on the transmission side of the fourth beam splitter 51. Moreover, a TV image forming lens 54 is arranged on the optical path on the reflection side of the fourth beam splitter 51, and a CCD camera 55 is arranged at the focal position of the TV image forming lens 54.

In the laser scanning microscope 200, light emitted from the white LED light source 53 transmits the fourth beam splitter 51 while being gathered by the projection lens 52. This light is reflected by the third beam splitter 50, incident to the objective lens 5, and illuminates the sample 3 to be examined. The light reflected from the sample 3 to be examined is again gathered by the objective lens 5, reflected by the third beam splitter 50 and the fourth beam splitter 51, and gathered by the TV image forming lens 54. Then, the image is formed on the image capturing surface of the CCD camera 55.

The magnification of the TV image forming lens 54 is adjusted so that the image capturing area of the CCD camera 55 becomes identical in size to the observation area of the optics system, namely, the maximum scanning area of the two-dimensional light deflector 9 of the laser scanning microscope 200.

Procedures for obtaining height profile data with the laser scanning microscope 200 according to the second embodiment are described next.

Also in the second embodiment, a desired measurement region of the sample 3 to be examined is partitioned to fit the size of the observable viewfield of the laser scanning microscope in a similar manner as in the first embodiment as shown in FIG. 4. At this time, two adjacent regions among the partitioned regions respectively have their overlapping region. Assume that the measurement region is partitioned into three regions such as A1, A2, and A3 in this embodiment.

Initially, the intensity image of the surface of the sample 3 to be examined is captured with the CCD camera 55 in the state where the region A1 is being observed, and the captured image is stored in the memory. Next, scanning not in the θy direction but in the θx direction (hereinafter referred to as X scanning) only of the two-dimensional light deflector 9 is made. At this time, only one line within the region A1, which corresponds to the θx direction, is scanned on the sample 3 to be examined. By making Z scanning while making X scanning, the height profile of one line within the region A1 can be obtained.

Next, the stage device 4 is moved in the X direction to shift the observation viewfield of the microscope to the region A2. In a similar manner as in the case of the region A1, the intensity image of the surface of the region A2 is captured with the CCD camera 55, and stored in the memory. By making Z scanning while making X scanning for only one line with laser light, the height profile of one line within the region A2 is obtained. A similar measurement is made also for the region A3.

As a result of these operations, the intensity image Img1 of the region A1 shown in FIG. 8A, the intensity image Img2 of the region A2 shown in FIG. 8B, and the intensity image Img3 of the region A3 shown in FIG. 8C are obtained.

Next, the intensity images Img1, Img2, and Img3 are linked by being shifted in the X direction so that the intensity information of the intensity images of overlapping regions 61-1 and 61-2 are best aligned. Furthermore, the profiles are linked by shifting the intensity images in the Z direction so that the height information of the height profile data of the overlapping regions are best aligned. As a result of these processes, one continuous intensity image and height profile can be obtained.

Figure 9:
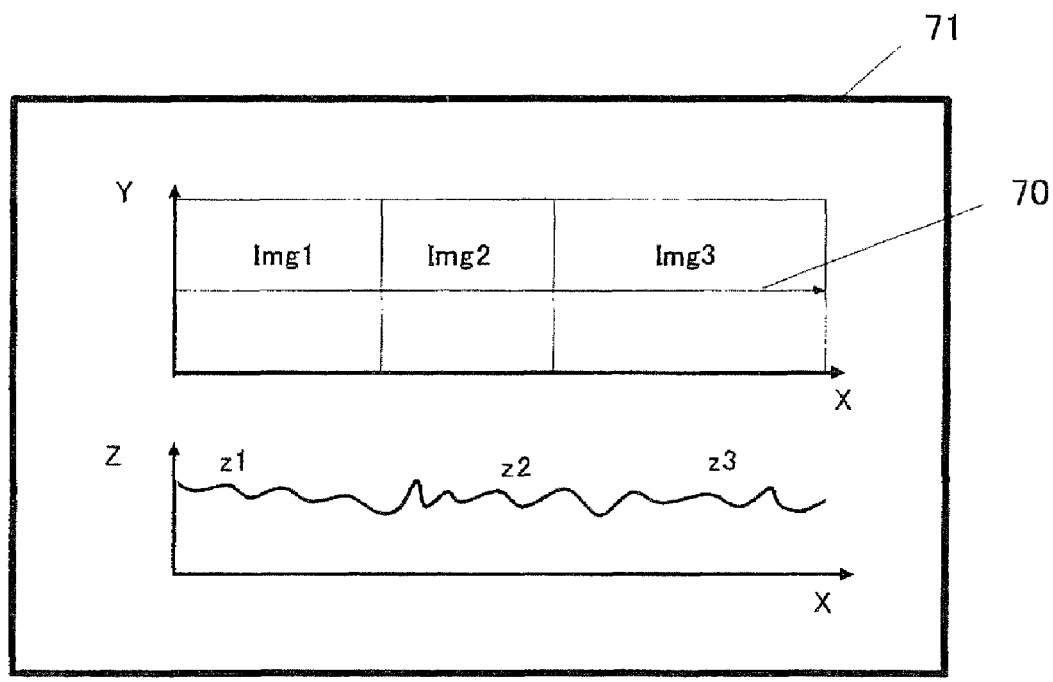
FIG. 9 is a schematic diagram showing an example of a display screen of intensity images and height profiles, which are obtained with the laser scanning microscope according to the second embodiment.

The obtained intensity image and height profile are displayed on the screen of the display unit 21 as an application screen 71 shown in FIG. 9. The laser scanning microscope 200 is configured so that the image capturing area of the CCD camera 55 matches the scanning range of the two-dimensional light deflector 9. Therefore, the position of one line for which the height profile is measured is displayed as an impose line 70 within the linked intensity image on the application screen 71.

With the laser scanning microscope 200 according to the second embodiment, data are linked in the X direction by using not an intensity in the state of a line but intensity information of a surface with a lot more information amount. As a result, data can be linked with high accuracy, and the reliability of measurement data can be improved.

Additionally, the linkage result of the intensity images of the surface is information that is very effective to grasp the state of the portion in which the height profile is measured. For example, a flaw, a foreign material such as dust, etc. on a surface, which cannot be found only with height profile data, can be identified from the intensity image. Moreover, color information can be obtained if a color CCD camera is used as the CCD camera. As a result, information such as a difference of a material of a sample to be examined can be obtained, thereby improving the analytic efficiency of data.

The configuration where the white LED light source 53 is used as a light source is described above. However, for example, a halogen lamp or a mercury lamp may be used as a replacement for the white LED light source 53. Moreover, the CCD camera 55 is used as the image capturing element. Alternatively, for example, a CMOS camera may be used as the image capturing element. Namely, any element is available as far as it can capture a two-dimensional image.

Furthermore, a CF intensity image obtained with the first photodetector 14, or an NCF intensity image obtained with the second photodetector 15 may be available as a replacement for an intensity image captured with the CCD camera 55 as described in this embodiment. If an NCF intensity image is used, also an unfocused portion has a characteristic. Therefore, linkage in consideration of the entire image can be made.

In the laser scanning microscope 200 according to the second embodiment, two-dimensional scanning may be made with the two-dimensional light deflector 9 when an intensity image is obtained. To obtain an intensity image, not three-dimensional but two-dimensional scanning is required, and Z scanning is not required. Therefore, only a very small amount of measurement time is required to obtain an intensity image, and the tact time of measurement is not degraded.

A third embodiment is described next.

A configuration of a laser scanning microscope according to the third embodiment is fundamentally the same as the laser scanning microscope 100 according to the first embodiment shown in FIG. 1. Only a control program executed by the controlling unit 16, and a program that is stored in the storing unit 18 and executed by the arithmetic processing unit 19 are different from those of the laser scanning microscope 100 according to the first embodiment.

The laser scanning microscope according to the third embodiment is intended to obtain a profile of a cross section of a line that passes through the vertex of the surface of a desired sample to be examined having a curvature, such as a lens, etc. Its process flow is described below.

Figure 10:
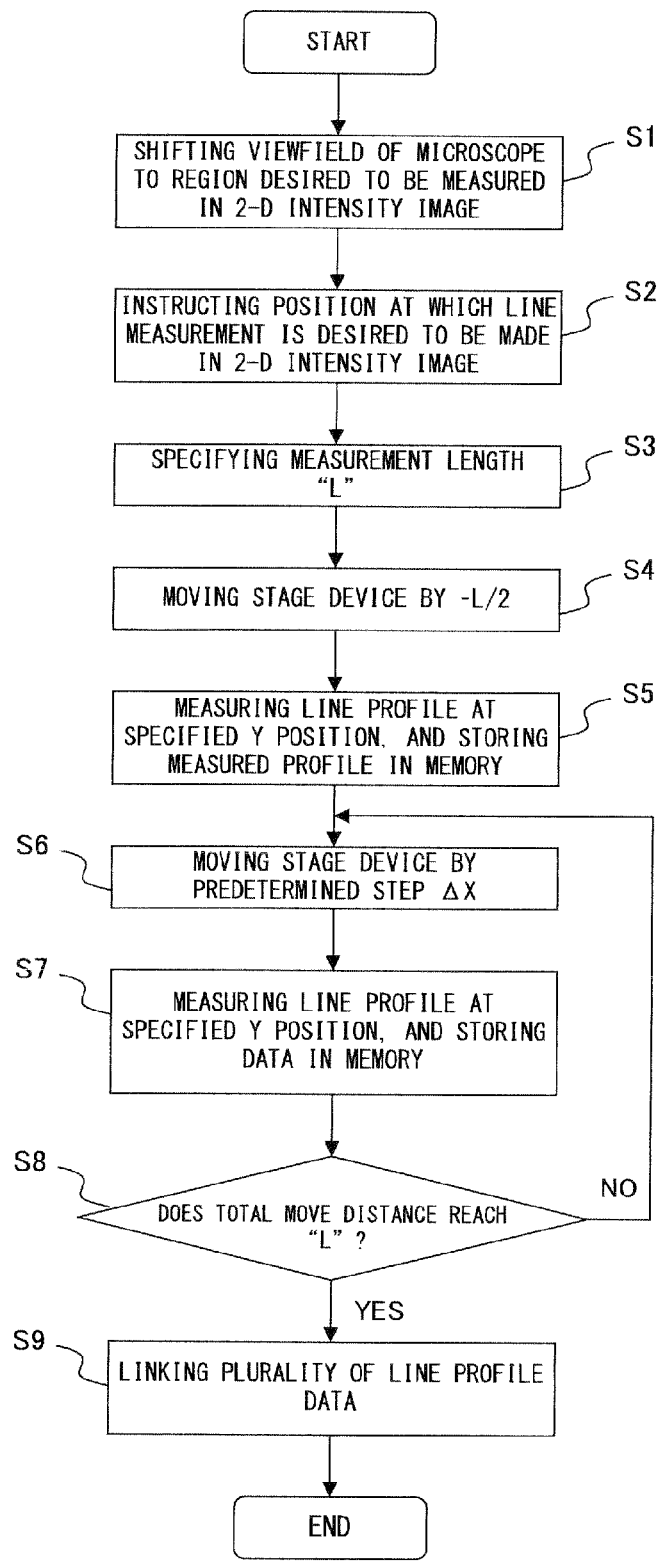
FIG. 10 is a flowchart showing an operational process executed by a laser scanning microscope according to a third embodiment.

FIG. 10 is a flowchart showing an operational process executed by the laser scanning microscope according to the third embodiment. The process shown in this figure is implemented in a way such that the arithmetic processing unit 19 executes the program within the storing unit 18.

Once the process shown in this figure is started, the laser scanning microscope initially causes an operator to move the stage device 4 in order to align the position of a sample to be examined so that a region desired to be measured, namely, the vertex of the surface of a lens in this embodiment enters the viewfield of the microscope (step S1).

Next, in step S2, the laser scanning microscope causes the operator to search for the vertex position of the surface of the lens within a 2-D intensity image, and to instruct the vertex position of the surface on the display screen of the display unit 21 by using the instruction inputting unit 20 such as a pointing device, etc.

Figure 11A:
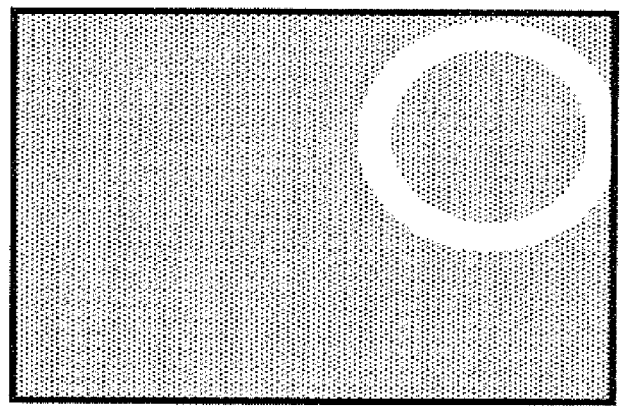
FIGS. 11A and 11B are schematic diagrams showing a 2-D intensity image when a lens is observed with confocal observation as a sample to be examined.
Figure 11B:
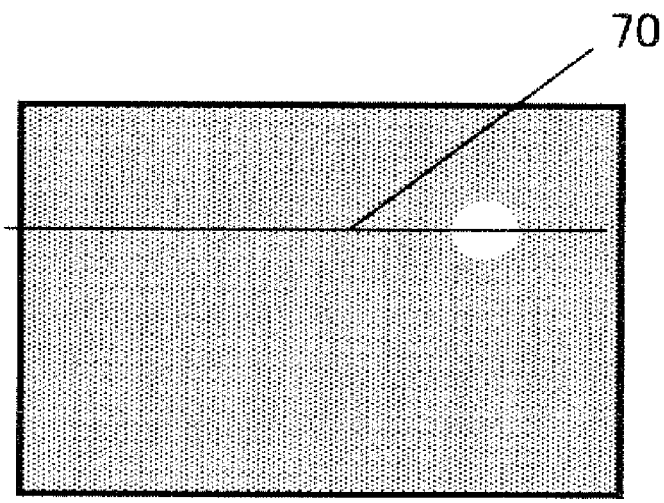

If an image is obtained as a 2-D intensity image shown in FIG. 11A when the lens as the sample to be examined is observed with confocal observation, its intensity pattern is concentric. This is the state where the image is focused on the slope surface of the lens. A portion that is bright in the state of a spot as shown in FIG. 11B is the vertex of the surface. The vertex of the surface of the lens can be easily identified from two-dimensional image information in this way. This step S2 may be performed not by an operator but by the scanning laser microscope, which automatically detects the vertex position.

Next, in step S3, the laser scanning microscope causes the operator to specify a measurement length "L" with the instruction inputting unit 20. Here, for example, the value of the diameter of the lens is specified as the value of "L".

Figure 12:
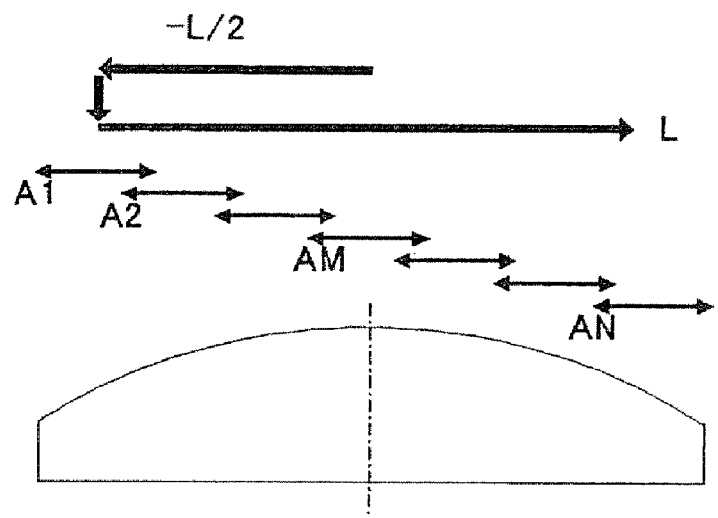
FIG. 12 is a schematic diagram showing the case where a stage device is moved by $-L/2$, and further moved by a predetermined step $\Delta x$ in the third embodiment.

Then, in step S4, the stage device 4 is moved by "−L/2" from the position instructed in step S2, and this position is set as a measurement starting position (the region A1 shown in FIG. 12) as shown in FIG. 12.

Then, the laser scanning microscope measures a height profile in the X direction. At this time, in step S5, the height profile is measured after the light deflection angle θy in the y direction of the two-dimensional light deflector 9 is set to an angle corresponding to the position in the Y direction within the screen, which is instructed in step S2, and measurement results are stored in the storing unit 18.

Next, in step S6, the stage device 4 is moved by a predetermined step "Δx" to shift the observation viewfield of the microscope to the region A2 as shown in FIG. 12. A height profile is measured in the state where the position to be again scanned in the Y direction is set to a predetermined position, and measurement results are stored in the storing unit 18 in step S7. The value of "Δx" in step S6 is set to a value smaller than the observation viewfield in the X direction so that, for example, adjacent measurement regions partially overlap.

Then, in step S8, it is determined whether or not the total move distance of the stage device 4 in step S6 reaches "L". If it is determined that the total move distance does not reach "L" ("NO" in step S8), the process goes back to step S6.

Figure 13A:
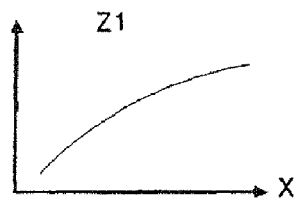
FIGS. 13A, 13B, 13C, and 13D are schematic diagrams showing height profile data obtained according to the third embodiment, and height profile data obtained by linking the height profile data.
Figure 13B:
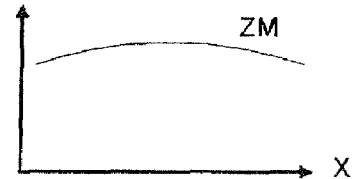
Figure 13C:
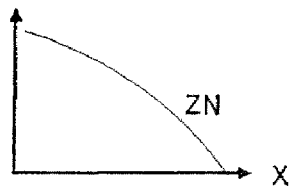
Figure 13D:
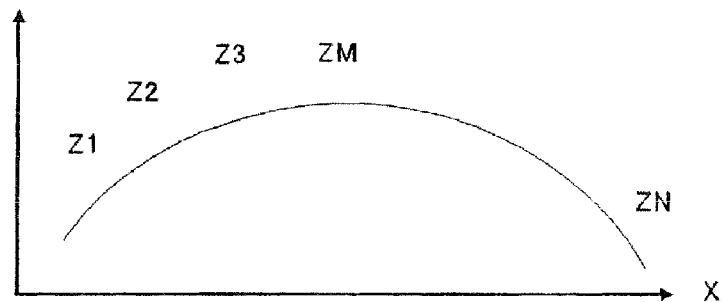

If it is determined in step S8 that the total move distance reaches "L" ("YES" in step S8), a process for linking the height profile data (shown in FIGS. 13A to 13C) obtained in step S7 is executed in step S9, and the linked data shown in FIG. 13D is obtained. Then, this process is terminated.

With the process flow shown in FIG. 10, a series of operations for determining a measurement position, for obtaining a plurality of height profiles, and for linking data are complete. The linked data is analyzed, stored, etc. in a similar manner as in the first and the second embodiments.

Since a stylus roughness meter fundamentally measures only a line, it is difficult to search for such a vertex of the surface of a lens in this way. With the method according to the third embodiment, however, the vertex of the surface can be easily found. The height data of one line that passes through the vertex is obtained, whereby a data analysis such as the curvature radius of a lens, an aspheric coefficient of an aspheric lens, etc. can be correctly made.

The above provided description refers to the example where the convex lens is measured as a sample to be examined. However, a concave lens as a sample to be examined can be measured with a similar method.

The above described example uses the confocal intensity image in order to search for the vertex of a surface. However, this embodiment is not limited to this method. For example, the vertex position of the surface may be identified by once making a 3-D measurement in the vicinity of the vertex, and by using the obtained data. Alternatively, the apex may be identified with a method such as image processing from a focused TV image by using the apparatus including a TV optics system as shown in FIG. 7.

Furthermore, the above example is described by taking the measurement of the shape of the lens as an example. However, any sample to be examined may be available, and its type is not limited.

The third embodiment is not limited to the above described method, and includes any process as far as it includes the flow for specifying a desired measurement line by using the intensity information or the height information of a surface, for measuring a line that passes through the specified line, and for linking measurement results.

A modification example of the third embodiment is described next.

In this modification example, a process for capturing an intensity image is added to the process of the third embodiment.

Figure 14:
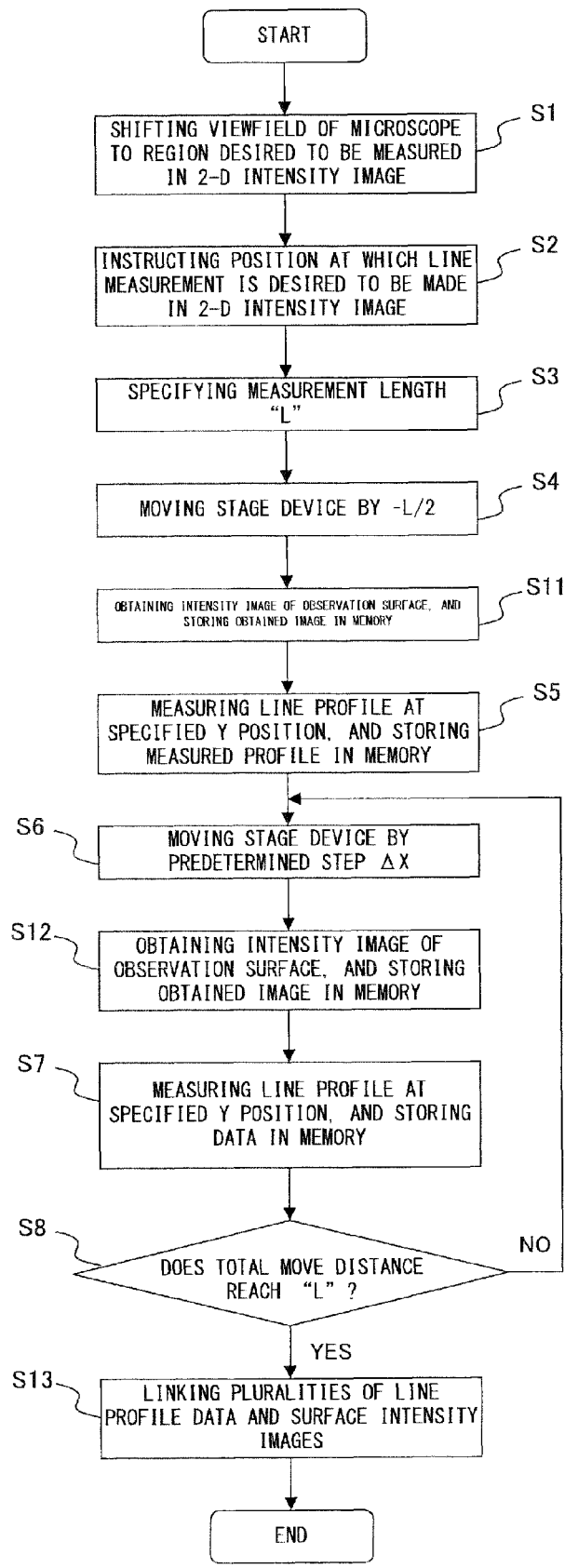
FIG. 14 is a flowchart showing a process executed by a modification example of the third embodiment.

FIG. 14 is a flowchart showing a process executed in the modification example of the third embodiment. The process flow shown in this figure is implemented by adding some processes to the flow of the third embodiment shown in FIG. 10. Accordingly, the same process steps as those of FIG. 10 are denoted with the same numerals, and their explanations are omitted.

In the flowchart shown in FIG. 14, step S11 for obtaining an intensity image at its observation position and for storing the obtained image in the storing unit 18 is interposed between steps S4 and S5, step S12 for obtaining an intensity image at its observation position and for storing the obtained image in the storing unit 18 is interposed between steps S6 and S7, and step S13 for linking both the intensity images and height profiles is added as a replacement for step 9.

The linkage process in step S13 is executed by determining a position in the X direction with the use of intensity images of a surface, and by determining a position in the Z direction with the use of height profiles as described above.

Note that the order of steps S11 and S5 may be reversed to execute step S11 after step S5 in the process flow shown in FIG. 14. Similarly, step S12 may be executed after step S7.

According to the process flow shown in FIG. 14, a set of a height profile at each measurement point and an intensity image of a surface can be obtained. A linked intensity image becomes very effective information to grasp the state of a portion in which a height profile is measured. For example, a flaw, a foreign material such as dust, etc. on a surface, which cannot be identified only with height profile data, can be identified from an intensity image. Moreover, color information can be obtained if a color CCD camera is used as a CCD camera. As a result, information such as a difference of a material of a sample to be examined can be obtained, and the analytic efficiency of data increases.

What is claimed is:

1. A laser scanning microscope apparatus comprising: a light deflecting unit that gathers light from a laser light source on a sample to be examined through an objective lens and can scan the sample to be examined independently in a surface direction with the laser light, a photo-detecting unit for detecting an amount of light that transmits an optical diaphragm arranged in a position conjugate to a focal position of the objective lens and is reflected from the sample to be examined, a Z scanning unit for changing a relative distance, in a direction of an optical axis of the objective lens, between the sample to be examined and the objective lens, and a controlling unit for obtaining height information at each scanning point of the sample to be examined by obtaining the relative distance that maximizes an intensity output from the photo-detecting, which is obtained when the sample to be examined is scanned with the light from the laser light source, when the relative distance is changed by the Z scanning unit, further comprising:

an arithmetic processing unit for obtaining a plurality of height profiles of one line acquired by scanning the sample to be examined in a state of a line with the light deflecting unit while shifting the plurality of height profiles in a scanning direction by a predetermined amount, and for obtaining one profile by linking the plurality of height profiles.

2. The laser scanning microscope apparatus according to claim 1, wherein
the arithmetic processing unit obtains the one profile by obtaining also an intensity profile when obtaining a height profile, by determining a height profile linkage position in the scanning direction so that shapes of intensity profiles are best aligned, and by determining a height profile linkage position in the direction of the optical axis of the objective lens with the use of information of the height profiles.

3. The laser scanning microscope apparatus according to claim 1, wherein
the arithmetic processing unit obtains the one profile by obtaining also intensity information of a surface, which corresponds to a height profile, when obtaining the height profile, by determining a height profile linkage position in the scanning direction with the use of the intensity information of the surface, and by determining a height profile linkage position in the direction of the optical axis of the objective lens with the use of information of the height profiles.

4. The laser scanning microscope apparatus according to claim 3, wherein
the arithmetic processing unit generates one intensity image by linking a plurality of pieces of intensity information of the surface, and displays a position, at which the height profile is measured, in the one intensity image.

5. The laser scanning microscope apparatus according to claim 3, wherein
the intensity information of the surface is a non-confocal image.

6. The laser scanning microscope apparatus according to claim 3, wherein
the intensity information of the surface is a confocal image.

7. The laser scanning microscope apparatus according to claim 1, wherein
the arithmetic processing unit obtains the one height profile by shifting the plurality of obtained height profiles of one line by a predetermined amount so that the height profiles partially overlap, and by linking the plurality of height profiles of one line so that the height profiles of overlapping regions are best aligned.

8. The laser scanning microscope apparatus according to claim 1, wherein
intensity outputs are sequentially obtained while continually making scanning in the direction of the optical axis of the objective lens without stopping the scanning when obtaining the intensity output of one line while changing the relative distance in the direction of the optical axis of the objective lens.

9. The laser scanning microscope apparatus according to claim 1, further comprising
a storing unit or an external storing unit for storing data, wherein the arithmetic processing unit stores the obtained one height profile in the storing unit or the external storing unit.

10. The laser scanning microscope apparatus according to claim 1, wherein
a frequency filter process is executed for the obtained one height profile.

11. The laser scanning microscope apparatus according to claim 1, wherein
a cutoff filter process stipulated for a stylus roughness meter is applied to the obtained one height profile, and a roughness parameter arithmetic operation is performed.

12. A laser scanning microscope apparatus comprising: a light deflecting unit that gathers light from a laser light source on a sample to be examined through an objective lens and can scan the sample to be examined independently in a surface direction with the laser light, a photo-detecting unit for detecting an amount of light that transmits an optical diaphragm arranged in a position conjugate to a focal position of the objective lens and is reflected from the sample to be examined, a Z scanning mechanism for changing a relative distance, in a direction of an optical axis of the objective lens, between the sample to be examined and the objective lens, and a controlling unit for obtaining height information at each scanning point of the sample to be examined by obtaining the relative distance that maximizes an intensity output from the photo-detecting unit, which is obtained when the sample to be examined is scanned with the light from the laser light source, when the relative distance is changed by the Z scanning mechanism, further comprising:
an illumination optics system of the laser scanning microscope, which is arranged to share the objective lens within an optics system of the microscope;
a two-dimensional image capturing unit for capturing an image with light from the illumination optics system; and
an arithmetic processing unit for obtaining a plurality of height profiles of one line acquired by scanning the sample to be examined in a state of a line with the light deflecting unit while shifting the plurality of height profiles in a scanning direction by a predetermined amount, for obtaining an intensity image with the two-dimensional image capturing unit when obtaining a height profile, and for obtaining one height profile and one intensity image based on the pluralities of height profiles and intensity images.

13. The laser scanning microscope apparatus according to claim 12, wherein
a position at which scanning is made to obtain the height profile is displayed in the linked intensity image.

14. The laser scanning microscope apparatus according to claim 12, wherein
the two-dimensional image capturing unit is a CCD image capturing element.

15. The laser scanning microscope apparatus according to claim 12, wherein
the one height profile is obtained by determining a height profile linkage position in the scanning direction by using the intensity images, and by determining a height profile linkage position in the direction of the optical axis of the objective lens with the use of the height profiles.

16. The laser scanning microscope apparatus according to claim 12, wherein
the arithmetic processing unit obtains the one height profile by shifting the plurality of obtained height profiles of one line by a predetermined amount so that the height profiles partially overlap, and by linking the plurality of height profiles of one line so that the height profiles of overlapping regions are best aligned.

17. The laser scanning microscope apparatus according to claim 12, wherein
intensity outputs are sequentially obtained while continually making scanning in the direction of the optical axis of the objective lens without stopping the scanning when obtaining the intensity output of one line while changing the relative distance in the direction of the optical axis of the objective lens.

18. The laser scanning microscope apparatus according to claim 12, further comprising
a storing unit or an external storing unit for storing data, wherein
the arithmetic processing unit stores the obtained one height profile in the storing unit or the external storing unit.

19. The laser scanning microscope apparatus according to claim 12, wherein
a frequency filter process is executed for the obtained one height profile.

20. The laser scanning microscope apparatus according to claim 12, wherein
a cutoff filter process stipulated for a stylus roughness meter is applied to the obtained one height profile, and a roughness parameter arithmetic operation is performed.

21. A laser scanning microscope apparatus comprising: a light deflecting unit that gathers light from a laser light source on a sample to be examined through an objective lens and can scan the sample to be examined independently in a surface direction with the laser light, a photo-detecting unit for detecting an amount of light that transmits an optical diaphragm arranged in a position conjugate to a focal position of the objective lens and is reflected from the sample to be examined, a Z scanning unit for changing a relative distance, in a direction of an optical axis of the objective lens, between the sample to be examined and the objective lens, and a controlling unit for obtaining height information at each scanning point of the sample to be examined by obtaining the relative distance that maximizes an intensity output from the photo-detecting unit, which is obtained when the sample to be examined is scanned with the light from the laser light source, when the relative distance is changed by the Z scanning unit, further comprising:
means for obtaining a plurality of height profiles of one line acquired by scanning the sample to be examined in a state of a line with the light deflecting unit while shifting the plurality of height profiles in a scanning direction by a predetermined amount; and
means for obtaining one profile by linking the plurality of height profiles.

22. A laser scanning microscope apparatus comprising: a light deflecting unit that gathers light from a laser light source on a sample to be examined through an objective lens and can scan the sample to be examined independently in a surface direction with the laser light, a photo-detecting unit for detecting an amount of light that transmits an optical diaphragm arranged in a position conjugate to a focal position of the objective lens and is reflected from the sample to be examined, a Z scanning mechanism for changing a relative distance, in a direction of an optical axis of the objective lens, between the sample to be examined and the objective lens, and a controlling unit for obtaining height information at each scanning point of the sample to be examined by obtaining the relative distance that maximizes an intensity output from the photo-detecting unit, which is obtained when the sample to be examined is scanned with the light from the laser light source, when the relative distance is changed by the Z scanning mechanism, further comprising:

illumination optics system means of the laser scanning microscope, which is arranged to share the objective lens within an optics system of the microscope;

two-dimensional image capturing means for capturing an image with light from the illumination optics system means; and arithmetic processing means for obtaining a plurality of height profiles of one line acquired by scanning the sample to be examined in a state of a line with the light deflecting unit while shifting the plurality of height profiles in a scanning direction by a predetermined amount, for obtaining an intensity image with the two-dimensional image capturing means when obtaining a height profile, and for obtaining one height profile and one intensity image based on pluralities of height profiles and intensity images.

* * * * *